United States Patent
Sato et al.

(10) Patent No.: US 7,595,939 B2
(45) Date of Patent: Sep. 29, 2009

(54) IMAGING LENS

(75) Inventors: Kenichi Sato, Saitama (JP); Minoru Taniyama, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/730,105

(22) Filed: Mar. 29, 2007

(65) Prior Publication Data
US 2007/0229988 A1 Oct. 4, 2007

(30) Foreign Application Priority Data
Mar. 30, 2006 (JP) ............................. P2006-094540
Oct. 20, 2006 (JP) ............................. P2006-285908
Mar. 16, 2007 (JP) ............................. P2007-068160

(51) Int. Cl.
*G08B 9/14* (2006.01)
(52) U.S. Cl. .......................... 359/785; 359/784; 359/744
(58) Field of Classification Search ................. 359/785, 359/784, 779, 774, 773, 772, 690, 689, 687, 359/686
See application file for complete search history.

(56) References Cited

U.S. PATENT DOCUMENTS

| | | | | |
|---|---|---|---|---|
| 5,798,508 | A * | 8/1998 | Walker et al. ................ | 235/380 |
| 6,124,985 | A * | 9/2000 | Abe ............................ | 359/690 |
| 6,234,395 | B1 * | 5/2001 | Chadima et al. ......... | 235/472.01 |
| 6,259,508 | B1 * | 7/2001 | Shigematsu .................. | 355/53 |
| 6,654,180 | B2 * | 11/2003 | Ori ............................. | 359/689 |
| 6,870,688 | B2 * | 3/2005 | Obama ........................ | 359/680 |
| 6,961,191 | B2 | 11/2005 | Sato | |
| 7,196,856 | B2 * | 3/2007 | Nakamura ................... | 359/785 |
| 7,239,458 | B2 * | 7/2007 | Zeng et al. .................. | 359/784 |
| 7,247,519 | B2 * | 7/2007 | Karnezos et al. ............ | 438/110 |
| 7,274,519 | B2 * | 9/2007 | Yamamoto et al. .......... | 359/785 |
| 7,295,384 | B1 | 11/2007 | Sato et al. | |
| 2004/0150893 | A1 | 8/2004 | Shinohara | |
| 2005/0002116 | A1 | 1/2005 | Nakamura | |

FOREIGN PATENT DOCUMENTS

| | | |
|---|---|---|
| EP | 1 840 616 A1 | 10/2007 |
| EP | 1 840 617 A2 | 10/2007 |
| EP | 1 840 618 A1 | 10/2007 |

* cited by examiner

*Primary Examiner*—Timothy J Thompson
(74) *Attorney, Agent, or Firm*—Birch, Stewart, Kolasch & Birch, LLP

(57) ABSTRACT

An imaging lens includes first to third lenses G1 to G3 arranged in order from a object side. The first lens has a biconvex shape in a vicinity of an optical axis Z1. The second lens has a concave surface facing a object side. The second lens has a negative refractive power. The third lens has a positive or negative refractive power and has a meniscus shape containing, in a vicinity of the optical axis, a convex surface facing the object side. The following conditional expression is satisfied:

$$0.7 < f1/f < 1.3$$

$$0.2 \leq D2/f < 0.5$$

where f denotes a focal length of the entire system of the imaging lens, f1 denotes a focal length of the first lens G1 and D2 denotes an interval on the optical axis Z1 between the first lens G1 and the second lens G2.

30 Claims, 18 Drawing Sheets

EXAMPLE 1

EXAMPLE 5

EXAMPLE 6

EXAMPLE 7

FIG. 8A

| | EXAMPLE 1 BASIC LENS DATA | | | | |
|---|---|---|---|---|---|
| | Si | Ri | Di | Ndj | νdj |
| G1 | 1 | 2.390 | 0.50 | 1.497 | 81.6 |
| | 2 | -500.000 | 2.00 | | |
| G2 | 3 | -2.208 | 0.40 | 1.531 | 55.5 |
| | 4 | 9.804 | 0.08 | | |
| G3 | 5 | 1.046 | 1.03 | 1.531 | 55.5 |
| | 6 | 1.655 | 1.00 | | |
| GC | 7 | ∞ | 0.30 | 1.516 | 64.1 |
| | 8 | ∞ | 0.10 | | |

(f=4.64mm, FNO.=3.5)

FIG. 8B

| | EXAMPLE 1 ASPHERIC DATA | | |
|---|---|---|---|
| ASPHERIC COEFFICIENT | SURFACE NUMBER | | |
| | 1ST SURFACE | 2ND SURFACE | 3RD SURFACE |
| K | 6.681E+00 | 0.000E+00 | 3.349E+00 |
| $A_3$ | -3.210E-02 | 1.940E-03 | 3.457E-02 |
| $A_4$ | 7.569E-02 | -1.084E-01 | 3.333E-02 |
| $A_5$ | -4.852E-01 | 1.974E-01 | 5.938E-02 |
| $A_6$ | 6.740E-01 | -2.495E-01 | -1.159E-01 |
| $A_7$ | -2.935E-01 | 1.682E-01 | -1.881E-02 |
| $A_8$ | -5.118E-01 | -5.424E-02 | 3.291E-02 |
| $A_9$ | 6.439E-01 | -3.793E-01 | 2.569E-02 |
| $A_{10}$ | -3.412E-01 | 3.906E-01 | -1.960E-02 |
| | 4TH SURFACE | 5TH SURFACE | 6TH SURFACE |
| K | 2.011E+01 | -9.290E-02 | -5.279E+00 |
| $A_3$ | -3.303E-01 | -2.782E-01 | 1.737E-01 |
| $A_4$ | 1.941E-01 | -7.270E-04 | -2.469E-01 |
| $A_5$ | -1.854E-02 | 3.124E-02 | 1.099E-01 |
| $A_6$ | -4.904E-02 | 1.143E-02 | -5.728E-03 |
| $A_7$ | -2.036E-02 | -3.017E-03 | -7.256E-03 |
| $A_8$ | 1.972E-02 | -2.775E-03 | 1.014E-04 |
| $A_9$ | 1.749E-02 | 4.433E-04 | 8.861E-04 |
| $A_{10}$ | -1.191E-02 | 9.367E-05 | -1.700E-04 |

FIG. 9A

| | EXAMPLE 2 BASIC LENS DATA | | | | |
|---|---|---|---|---|---|
| | Si | Ri | Di | Ndj | νdj |
| G1 | 1 | 2.494 | 0.50 | 1.531 | 55.5 |
| | 2 | -100.000 | 1.80 | | |
| G2 | 3 | -2.158 | 0.40 | 1.604 | 27.2 |
| | 4 | 77.993 | 0.08 | | |
| G3 | 5 | 1.063 | 1.04 | 1.531 | 55.5 |
| | 6 | 1.702 | 1.00 | | |
| GC | 7 | ∞ | 0.30 | 1.516 | 64.1 |
| | 8 | ∞ | 0.11 | | |

(f=4.38mm, FNO.=5.0)

FIG. 9B

| | EXAMPLE 2 ASPHERIC DATA | | |
|---|---|---|---|
| ASPHERIC COEFFICIENT | SURFACE NUMBER | | |
| | 1ST SURFACE | 2ND SURFACE | 3RD SURFACE |
| K | 6.843E+00 | 0.000E+00 | 3.349E+00 |
| $A_3$ | -3.453E-02 | -1.014E-03 | 3.457E-02 |
| $A_4$ | 7.512E-02 | -8.756E-02 | 3.333E-02 |
| $A_5$ | -4.558E-01 | 1.670E-01 | 5.938E-02 |
| $A_6$ | 6.707E-01 | -3.327E-01 | -1.159E-01 |
| $A_7$ | -3.542E-01 | 1.602E-01 | -1.881E-02 |
| $A_8$ | -6.103E-01 | 2.535E-01 | 3.291E-02 |
| $A_9$ | 6.062E-01 | 1.862E-01 | 2.569E-02 |
| $A_{10}$ | 1.844E-02 | -1.267E+00 | -1.960E-02 |
| | 4TH SURFACE | 5TH SURFACE | 6TH SURFACE |
| K | 1.367E+03 | -4.142E-02 | -5.279E+00 |
| $A_3$ | -2.947E-01 | -2.833E-01 | 1.726E-01 |
| $A_4$ | 1.843E-01 | 1.914E-03 | -2.490E-01 |
| $A_5$ | -1.734E-02 | 3.135E-02 | 1.111E-01 |
| $A_6$ | -4.640E-02 | 1.124E-02 | -5.728E-03 |
| $A_7$ | -1.963E-02 | -3.114E-03 | -7.256E-03 |
| $A_8$ | 1.934E-02 | -2.803E-03 | 1.014E-04 |
| $A_9$ | 1.707E-02 | 4.472E-04 | 8.861E-04 |
| $A_{10}$ | -1.187E-02 | 1.007E-04 | -1.700E-04 |

FIG. 10A

| EXAMPLE 3 BASIC LENS DATA |||||
|---|---|---|---|---|
| Si | Ri | Di | Ndj | $\nu dj$ |
| G1: 1 | 1.941 | 0.50 | 1.531 | 55.5 |
| G1: 2 | -100.000 | 1.30 | | |
| G2: 3 | -1.778 | 0.40 | 1.604 | 27.2 |
| G2: 4 | 6.968 | 0.08 | | |
| G3: 5 | 1.085 | 1.04 | 1.531 | 55.5 |
| G3: 6 | 2.352 | 1.00 | | |
| GC: 7 | ∞ | 0.30 | 1.516 | 64.1 |
| GC: 8 | ∞ | 0.18 | | |

(f=4.34mm, FNO.=5.0)

FIG. 10B

| EXAMPLE 3 ASPHERIC DATA ||||
|---|---|---|---|
| ASPHERIC COEFFICIENT | SURFACE NUMBER |||
| | 1ST SURFACE | 2ND SURFACE | 3RD SURFACE |
| K | 4.065E+00 | 0.000E+00 | 3.349E+00 |
| $A_3$ | -9.693E-03 | 1.299E-02 | 3.457E-02 |
| $A_4$ | 3.415E-02 | -1.249E-01 | 3.333E-02 |
| $A_5$ | -5.327E-01 | 1.602E-01 | 5.938E-02 |
| $A_6$ | 6.493E-01 | -3.966E-01 | -1.159E-01 |
| $A_7$ | -1.709E-01 | 7.813E-02 | -1.881E-02 |
| $A_8$ | -1.301E-01 | 3.259E-01 | 3.291E-02 |
| $A_9$ | 9.242E-01 | 5.016E-01 | 2.569E-02 |
| $A_{10}$ | -2.464E+00 | -1.380E+00 | -1.960E-02 |
| | 4TH SURFACE | 5TH SURFACE | 6TH SURFACE |
| K | -1.192E+01 | -4.827E-02 | -5.279E+00 |
| $A_3$ | -2.899E-01 | -2.884E-01 | 1.380E-01 |
| $A_4$ | 1.922E-01 | 1.703E-03 | -2.468E-01 |
| $A_5$ | -9.983E-03 | 3.149E-02 | 1.097E-01 |
| $A_6$ | -4.363E-02 | 1.128E-02 | -5.728E-03 |
| $A_7$ | -1.940E-02 | -3.141E-03 | -7.256E-03 |
| $A_8$ | 1.915E-02 | -2.826E-03 | 1.014E-04 |
| $A_9$ | 1.744E-02 | 4.428E-04 | 8.861E-04 |
| $A_{10}$ | -1.081E-02 | 1.108E-04 | -1.700E-04 |

FIG. 11A

| | EXAMPLE 4 BASIC LENS DATA | | | | |
|---|---|---|---|---|---|
| | Si | Ri | Di | Ndj | νdj |
| G1 | 1 | 2.568 | 0.50 | 1.531 | 55.5 |
| | 2 | -100.000 | 1.80 | | |
| G2 | 3 | -2.207 | 0.40 | 1.604 | 27.2 |
| | 4 | 240.504 | 0.08 | | |
| G3 | 5 | 1.066 | 1.04 | 1.531 | 55.5 |
| | 6 | 1.676 | 1.00 | | |
| GC | 7 | ∞ | 0.30 | 1.516 | 64.1 |
| | 8 | ∞ | 0.18 | | |

(f=4.43mm, FNO.=5.0)

FIG. 11B

| | EXAMPLE 4 ASPHERIC DATA | | |
|---|---|---|---|
| ASPHERIC COEFFICIENT | SURFACE NUMBER | | |
| | 1ST SURFACE | 2ND SURFACE | 3RD SURFACE |
| K | 6.923E+00 | 0.000E+00 | 3.349E+00 |
| $A_3$ | -3.450E-02 | -1.933E-04 | 3.457E-02 |
| $A_4$ | 7.665E-02 | -8.728E-02 | 3.333E-02 |
| $A_5$ | -4.531E-01 | 1.587E-01 | 5.938E-02 |
| $A_6$ | 6.723E-01 | -3.478E-01 | -1.159E-01 |
| $A_7$ | -3.542E-01 | 1.704E-01 | -1.881E-02 |
| $A_8$ | -6.104E-01 | 3.612E-01 | 3.291E-02 |
| $A_9$ | 6.092E-01 | 3.845E-01 | 2.569E-02 |
| $A_{10}$ | 2.967E-02 | -1.833E+00 | -1.960E-02 |
| | 4TH SURFACE | 5TH SURFACE | 6TH SURFACE |
| K | 1.336E+04 | -3.995E-02 | -5.279E+00 |
| $A_3$ | -2.946E-01 | -2.835E-01 | 1.743E-01 |
| $A_4$ | 1.849E-01 | 2.104E-03 | -2.486E-01 |
| $A_5$ | -1.703E-02 | 3.149E-02 | 1.111E-01 |
| $A_6$ | -4.644E-02 | 1.130E-02 | -5.728E-03 |
| $A_7$ | -1.984E-02 | -3.100E-03 | -7.256E-03 |
| $A_8$ | 1.920E-02 | -2.801E-03 | 1.014E-04 |
| $A_9$ | 1.718E-02 | 4.455E-04 | 8.861E-04 |
| $A_{10}$ | -1.148E-02 | 9.887E-05 | -1.700E-04 |

FIG. 12

| | EXAMPLE 5 BASIC LENS DATA | | | | |
|---|---|---|---|---|---|
| | Si | Ri | Di | Ndj | νdj |
| G1 | 1 | 1.822 | 0.69 | 1.532 | 55.4 |
| | 2 | -87.907 | 0.95 | | |
| G2 | 3 | -1.315 | 0.59 | 1.606 | 27 |
| | 4 | -73.134 | 0.19 | | |
| G3 | 5 | 1.271 | 1.30 | 1.532 | 55.4 |
| | 6 | 3.247 | 1.00 | | |
| GC | 7 | ∞ | 0.30 | 1.516 | 64.1 |
| | 8 | ∞ | 0.39 | | |

(f=4.67mm, FNO.=2.8)

FIG. 13

| ASPHERIC COEFFICIENT | EXAMPLE 5 ASPHERIC DATA | | |
|---|---|---|---|
| | SURFACE NUMBER | | |
| | 1ST SURFACE | 2ND SURFACE | 3RD SURFACE |
| K | 1.257E+00 | 1.000E+01 | 1.574E+00 |
| $A_3$ | -3.650E-02 | 3.506E-02 | -1.353E-01 |
| $A_4$ | 2.810E-01 | -2.494E-01 | 2.801E-01 |
| $A_5$ | -1.001E+00 | 5.668E-01 | -4.692E-02 |
| $A_6$ | 1.355E+00 | -7.539E-01 | -2.474E-01 |
| $A_7$ | -1.674E-01 | 1.494E-01 | 9.936E-02 |
| $A_8$ | -1.723E+00 | 3.424E-01 | 2.641E-01 |
| $A_9$ | 1.905E+00 | -3.271E-02 | 1.615E-01 |
| $A_{10}$ | -7.003E-01 | -1.802E-01 | -2.341E-01 |
| $A_{11}$ | — | — | -8.433E-03 |
| $A_{12}$ | — | — | -1.989E-02 |
| $A_{13}$ | — | — | -4.357E-02 |
| $A_{14}$ | — | — | -4.020E-02 |
| $A_{15}$ | — | — | 1.182E-03 |
| $A_{16}$ | — | — | 1.191E-01 |
| | 4TH SURFACE | 5TH SURFACE | 6TH SURFACE |
| K | 1.000E+01 | -6.503E+00 | -1.382E+01 |
| $A_3$ | -4.041E-01 | -2.064E-01 | 1.115E-01 |
| $A_4$ | 7.659E-02 | 1.343E-02 | -2.555E-01 |
| $A_5$ | 1.536E-01 | 4.095E-02 | 1.331E-01 |
| $A_6$ | -2.038E-02 | 1.578E-02 | -6.290E-03 |
| $A_7$ | -4.598E-02 | -1.147E-02 | -1.618E-02 |
| $A_8$ | 4.074E-02 | -6.651E-03 | 3.220E-04 |
| $A_9$ | 4.891E-02 | 4.074E-03 | 3.022E-03 |
| $A_{10}$ | -4.021E-02 | -5.336E-04 | -7.869E-04 |
| $A_{11}$ | 8.057E-04 | 2.271E-05 | 1.385E-05 |
| $A_{12}$ | 2.474E-04 | 2.056E-05 | 6.523E-06 |
| $A_{13}$ | -2.160E-04 | 1.403E-05 | 6.869E-07 |
| $A_{14}$ | -1.145E-06 | 5.163E-06 | 6.617E-07 |
| $A_{15}$ | -2.951E-04 | -3.894E-07 | 8.253E-09 |
| $A_{16}$ | 5.049E-04 | -2.800E-06 | -3.016E-07 |

FIG. 14

| | EXAMPLE 6 BASIC LENS DATA | | | | |
|---|---|---|---|---|---|
| | Si | Ri | Di | Ndj | νdj |
| G1 | 1 | 1.876 | 0.48 | 1.532 | 55.4 |
| | 2 | -85.036 | 0.96 | | |
| G2 | 3 | -1.276 | 0.49 | 1.606 | 27 |
| | 4 | -80.848 | 0.31 | | |
| G3 | 5 | 0.953 | 1.24 | 1.532 | 55.4 |
| | 6 | 1.881 | 1.00 | | |
| GC | 7 | ∞ | 0.30 | 1.516 | 64.1 |
| | 8 | ∞ | 0.24 | | |

(f=4.02mm, FNO.=2.8)

FIG. 15

| ASPHERIC COEFFICIENT | EXAMPLE 6 ASPHERIC DATA ||| 
|---|---|---|---|
| | SURFACE NUMBER |||
| | 1ST SURFACE | 2ND SURFACE | 3RD SURFACE |
| K | 8.185E-01 | -9.673E+00 | 1.527E+00 |
| $A_3$ | -3.447E-02 | 3.925E-02 | -2.027E-01 |
| $A_4$ | 2.738E-01 | -2.619E-01 | 2.637E-01 |
| $A_5$ | -1.024E+00 | 5.300E-01 | -5.408E-02 |
| $A_6$ | 1.349E+00 | -7.670E-01 | -2.400E-01 |
| $A_7$ | -1.301E-01 | 1.604E-01 | 1.235E-01 |
| $A_8$ | -1.702E+00 | 3.670E-01 | 2.942E-01 |
| $A_9$ | 1.859E+00 | -3.975E-02 | 1.875E-01 |
| $A_{10}$ | -8.121E-01 | -2.712E-01 | -2.176E-01 |
| $A_{11}$ | — | — | -1.646E-02 |
| $A_{12}$ | — | — | -4.337E-02 |
| $A_{13}$ | — | — | -6.571E-02 |
| $A_{14}$ | — | — | -5.872E-02 |
| $A_{15}$ | — | — | 1.714E-02 |
| $A_{16}$ | — | — | 1.696E-01 |
| | 4TH SURFACE | 5TH SURFACE | 6TH SURFACE |
| K | 1.000E+01 | -3.626E+00 | -1.804E+01 |
| $A_3$ | -4.844E-01 | -1.896E-01 | 1.782E-01 |
| $A_4$ | 5.420E-02 | 1.494E-02 | -2.938E-01 |
| $A_5$ | 1.597E-01 | 3.962E-02 | 1.367E-01 |
| $A_6$ | -8.624E-03 | 1.544E-02 | -3.542E-03 |
| $A_7$ | -3.723E-02 | -1.132E-02 | -1.550E-02 |
| $A_8$ | 4.520E-02 | -6.500E-03 | 3.986E-04 |
| $A_9$ | 5.026E-02 | 4.131E-03 | 2.993E-03 |
| $A_{10}$ | -4.021E-02 | -5.377E-04 | -8.120E-04 |
| $A_{11}$ | 5.584E-05 | 6.225E-07 | 1.642E-06 |
| $A_{12}$ | -3.909E-04 | -2.200E-07 | 2.674E-06 |
| $A_{13}$ | -5.468E-04 | 1.763E-06 | -2.244E-07 |
| $A_{14}$ | 7.950E-06 | 4.540E-07 | 7.627E-07 |
| $A_{15}$ | -5.041E-05 | -8.087E-08 | 2.841E-07 |
| $A_{16}$ | 8.701E-04 | -9.785E-08 | -7.145E-08 |

FIG. 16A

| | EXAMPLE 7 BASIC LENS DATA | | | | |
|---|---|---|---|---|---|
| | Si | Ri | Di | Ndj | νdj |
| G1 | 1 | 1.810 | 0.69 | 1.497 | 81.6 |
| | 2 | -200.000 | 1.48 | | |
| G2 | 3 | -1.960 | 0.69 | 1.531 | 55.5 |
| | 4 | -9.015 | 0.05 | | |
| G3 | 5 | 2.298 | 0.94 | 1.531 | 55.5 |
| | 6 | 1.711 | 0.70 | | |
| GC | 7 | ∞ | 0.30 | 1.516 | 64.1 |
| | 8 | ∞ | 0.26 | | |

(f=5.15mm, FNO.=3.5)

FIG. 16B

| | EXAMPLE 7 ASPHERIC DATA | | |
|---|---|---|---|
| ASPHERIC COEFFICIENT | SURFACE NUMBER | | |
| | 1ST SURFACE | 2ND SURFACE | 3RD SURFACE |
| K | 3.181E+00 | 0.000E+00 | 3.349E+00 |
| $A_3$ | -4.253E-02 | -1.835E-03 | 3.457E-02 |
| $A_4$ | 1.037E-01 | -7.409E-02 | 3.333E-02 |
| $A_5$ | -4.500E-01 | 1.583E-01 | 5.938E-02 |
| $A_6$ | 5.936E-01 | -2.497E-01 | -1.159E-01 |
| $A_7$ | -2.871E-01 | 1.906E-01 | -1.881E-02 |
| $A_8$ | -4.648E-01 | -1.811E-01 | 3.291E-02 |
| $A_9$ | 7.115E-01 | 1.056E-01 | 2.569E-02 |
| $A_{10}$ | -3.641E-01 | -1.126E-02 | -1.960E-02 |
| | 4TH SURFACE | 5TH SURFACE | 6TH SURFACE |
| K | 0.000E+00 | -4.989E+01 | -5.279E+00 |
| $A_3$ | -2.185E-01 | -4.651E-02 | -2.079E-02 |
| $A_4$ | 2.436E-01 | -5.147E-02 | -1.108E-01 |
| $A_5$ | -5.478E-02 | 9.054E-03 | 7.190E-02 |
| $A_6$ | -3.975E-02 | 6.184E-03 | -5.728E-03 |
| $A_7$ | -1.092E-02 | 2.498E-03 | -7.256E-03 |
| $A_8$ | 2.242E-02 | 2.274E-03 | 1.014E-04 |
| $A_9$ | 1.746E-02 | 1.853E-03 | 8.861E-04 |
| $A_{10}$ | -1.187E-02 | -1.637E-03 | -1.700E-04 |

FIG. 17

| | VALUES REGARDING CONDITIONAL EXPRESSION | | | | |
|---|---|---|---|---|---|
| | EXPRESSION(1) f1/f | EXPRESSION(2) D2/f | EXPRESSION(3) \|f2/f\| | EXPRESSION(4) f3/f | EXPRESSION(5) $\nu 1 - \nu 2$ |
| EXAMPLE 1 | 1.03 | 0.43 | 0.72 | 0.73 | 26.1 |
| EXAMPLE 2 | 1.05 | 0.41 | 0.79 | 0.78 | 28.3 |
| EXAMPLE 3 | 0.83 | 0.30 | 0.53 | 0.68 | 28.3 |
| EXAMPLE 4 | 1.07 | 0.41 | 0.82 | 0.78 | 28.3 |
| EXAMPLE 5 | 0.72 | 0.20 | 0.47 | 0.69 | 28.4 |
| EXAMPLE 6 | 0.86 | 0.24 | 0.53 | 0.62 | 28.4 |
| EXAMPLE 7 | 0.70 | 0.29 | 0.95 | −5.50 | 26.1 |

FNO. = 3.50

SPHERICAL ABERRATION

EXAMPLE 1

ω = 31.2°

ASTIGMATISM

ω = 31.2°

DISTORTION

FNO. = 5.00

SPHERICAL ABERRATION

EXAMPLE 2

ω = 32.4°

ASTIGMATISM

ω = 32.4°

DISTORTION

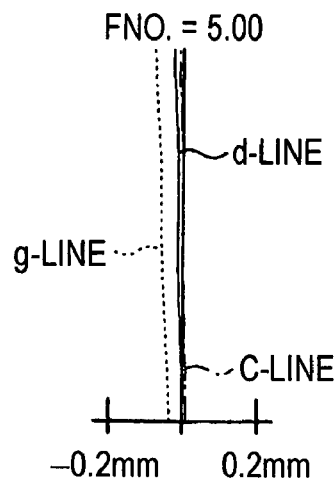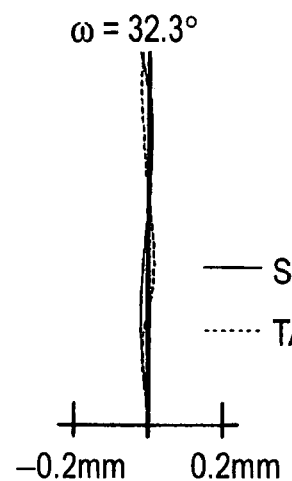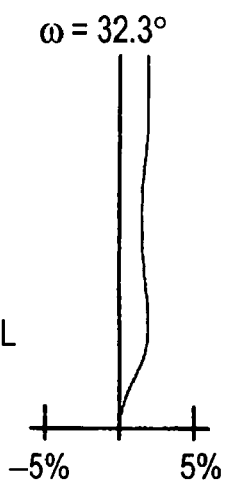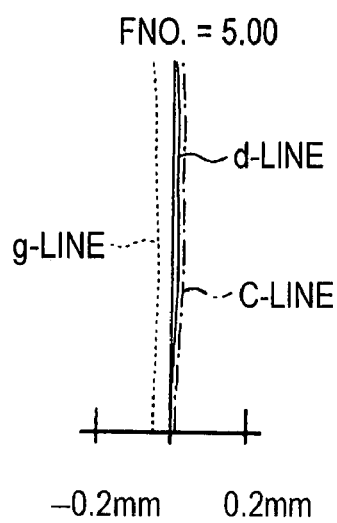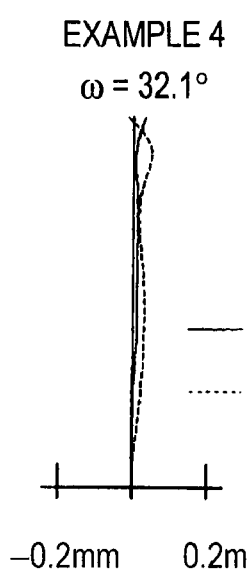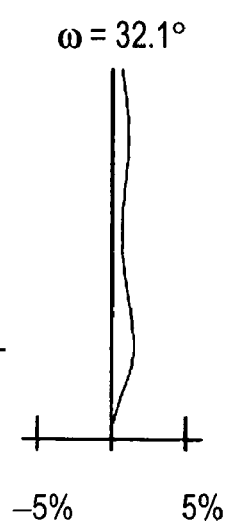

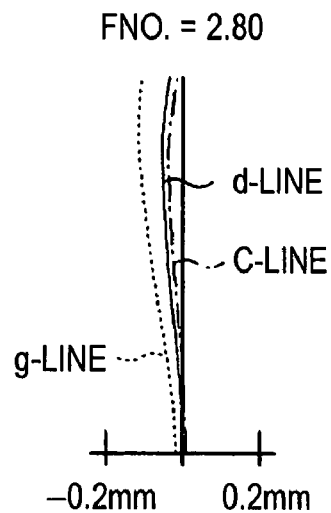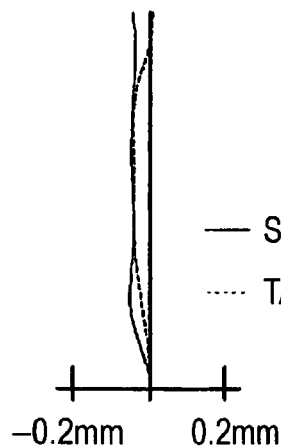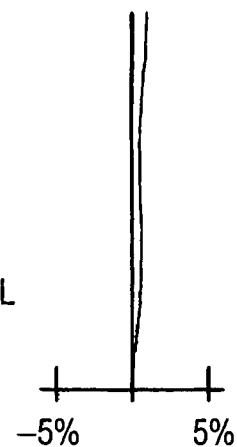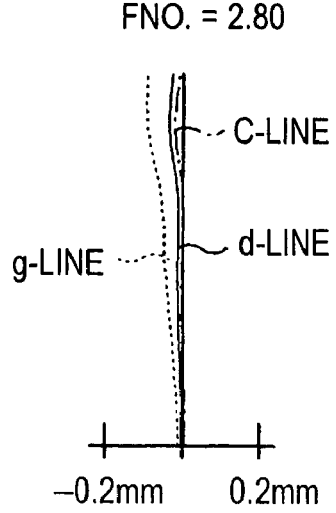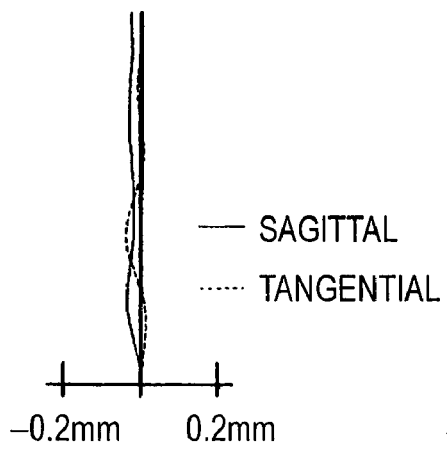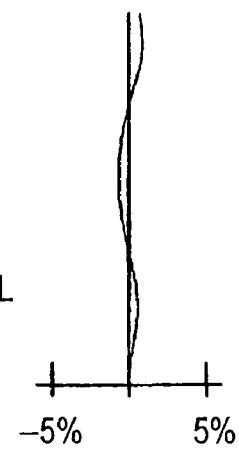

FNO. = 3.50 g-LINE
d-LINE
C-LINE

−0.2mm    0.2mm

SPHERICAL ABERRATION

EXAMPLE 7

ω = 28.4°

—— SAGITTAL
------ TANGENTIAL

−0.2mm    0.2mm

ASTIGMATISM

ω = 28.4°

−5%    5%

DISTORTION

IMAGING LENS

BACKGROUND OF THE INVENTION

1. Technical Field

The invention relates to an imaging lens mounted on an imaging device, such as a digital still camera, a cellular phone with camera, PDA (Personal Digital Assistance), including an imaging element such as a CCD (Charge Coupled Device) and a CMOS (Complementary Metal Oxide Semiconductor).

2. Description of the Related Art

In the field of an imaging element such as CCD and CMOS, a reduction in size and an increase in numbers of pixel are proceeding greatly nowadays. Therefore, a small and high performance type is required for an imaging device itself and lenses mounted on the imaging device. For the purpose of a reduction in size, reduction in a total length and reduction in height (size reduction in the diameter direction perpendicular to the optical axis) are required. Also, normally the telecentric property, i.e., an incident angle of the principal ray to the imaging element should be set closely in parallel to the optical axis (incident angle on the imaging plane comes close to zero with respect to a normal line to the imaging plane), as well as the reduction in size is demanded in the imaging optical system. In order to ensure the telecentric property, it is preferable that an optical aperture diaphragm is arranged as closely as possible to the object side. JP 2005-292235 A and JP 2004-240063 A (corresponding to US 2004/150893 A) disclose an imaging lens having such a configuration that three lenses are provided as a whole and that an optical aperture diaphragm is arranged on the most object side.

By the way, as number of pixels in an imaging element increases, a mechanical shutter is provided in an imaging device for capturing a still image in order to attempt to reduce a signal noise in the imaging element. When the shutter is provided, it is preferable that the mechanical shutter is arranged near an optical aperture diaphragm to reduce unevenness in a quantity of light. In contrast, in the imaging lens having a three-lens configuration, as described above, it is preferable that an optical aperture diaphragm is arranged as closely as possible to the object side, e.g., in front of or in rear of a first lens, in order to ensure the telecentric property. However, it is disadvantageous in size reduction that the shutter mechanism is arranged on the most-object side, e.g., in front of the first lens. Therefore, it may be considered that the shutter mechanism is arranged inside the lens system, e.g., between the first lens and a second lens. For that purpose, it is demanded to develop a lens having high aberration property compatible with increase of number of pixels while ensuring a sufficient air interval between the first lens and the second lens in the three-lens imaging lens in order to arrange the shutter mechanism. Example 3 in JP 2005-292235 A provides such a lens configuration that an interval between the first lens and the second lens is ensured relatively widely, which is advantageous in arrangement of the shutter mechanism. However, it is further demanded to develop a lens that is more advantageous in arrangement of the shutter mechanism and has high aberration property.

SUMMARY OF THE INVENTION

The invention has been made in view of these circumstances and provides a small-sized and high-performance imaging lens which can ensure sufficiently an internal interval where the shutter mechanism is disposed, while maintaining high aberration performance compatible with increase in number of pixels.

According to an aspect of the invention, an imaging lens includes first to third lenses. The first lens has a biconvex shape in a vicinity of an optical axis. The second lens has a concave surface facing a object side. The second lens has a negative refractive power. The third lens has a positive or negative refractive power and has a meniscus shape containing, in a vicinity of the optical axis, a convex surface facing the object side. The first lens, the second lens and the third lens are arranged in order from the object side. At least one of surfaces of the first to third lenses is aspherical. The following conditional expression is satisfied:

$$0.7 < f1/f < 1.3$$

$$0.2 < D2/f < 0.5$$

where f denotes a focal length of the entire system of the imaging lens, f1 denotes a focal length of the first lens and D2 denotes an interval on the optical axis between the first lens and the second lens.

With this configuration, since a shapes and a refractive force of each lens are optimized in the lens configuration having few lenses, that is, three lenses as a whole, a reduction in size can be attained. Also, since the conditional expression (2) is satisfied, the interval between the first lens and the second lens can be widely ensured. This configuration is advantageous in arranging the shutter mechanism. Also, since the shape of the first lens has the biconvex shape in the vicinity of the optical axis, it is easy to ensure the interval where the shutter mechanism is disposed in rear of the first lens in comparison with the case where the surface of the first lens on the image side has a concave shape. Also, since the conditional expression (1) is satisfied, a power distribution of the first lens is optimized and the high aberration performance compatible with the increase in the number of pixels is maintained.

Also, the following conditional expression may be further satisfied. With this configuration, a power balance between the second lens and the third lens is optimized and a high performance is easily achieved.

$$0.3 < |f2/f| < 1.0$$

$$0.5 < f3/f < 1.0$$

where f2 denotes a focal length of the second lens and f3 denotes a focal length of the third lens.

Also, the following conditional expression may be further satisfied. This configuration is advantageous in correction of the chromatic aberration.

$$20 < v1 - v2$$

where v1 denotes Abbe number of the first lens and v2 denotes Abbe number of the second lens.

Also, the second lens may have a biconcave shape in a vicinity of the optical axis. With this configuration, the respective conditional expressions are easily satisfied, and the higher performance is easily attained.

Also, the second lens may have a meniscus shape in the vicinity of the optical axis.

According to the imaging lens of the invention, the lens configuration having few lenses, that is, the three lenses as a whole is made to satisfy the predetermined conditional expressions so as to optimize the shape and the refractive power of each lens and arrangement of each lens. Therefore, the invention can realize the small-sized and high-performance lens system capable of ensuring the sufficient internal interval where the shutter mechanism is disposed, while maintaining the high aberration performance compatible with the increase in the number of pixels.

BRIEF DESCRIPTION OF THE DRAWINGS

FIG. 8 is a view showing lens data of the imaging lens according to the example 1 of the invention, FIG. 8A shows basic lens data and FIG. 8B shows lens data regarding aspheric surfaces.

FIG. 9 is a view showing lens data of the imaging lens according to the example 2 of the invention, FIG. 9A shows basic lens data and FIG. 9B shows lens data regarding aspheric surfaces.

FIG. 10 is a view showing lens data of the imaging lens according to the example 3 of the invention, FIG. 10A shows basic lens data and FIG. 10B shows lens data regarding aspheric surfaces.

FIG. 11 is a view showing lens data of the imaging lens according to the example 4 of the invention, FIG. 11A shows basic lens data and FIG. 11B shows lens data regarding aspheric surfaces.

FIG. 12 is a view showing basic lens data of the imaging lens according to the example 5.

FIG. 13 is a view showing lens data regarding aspheric surfaces of the imaging lens according to the example 5.

FIG. 14 is a view showing basic lens data of the imaging lens according to the example 6.

FIG. 15 is a view showing lens data regarding aspheric surfaces of the imaging lens according to the example 6.

FIG. 16 is a view showing lens data of the imaging lens according to the example 7 of the invention, FIG. 16A shows basic lens data and FIG. 16B shows lens data regarding aspheric surfaces.

FIG. 17 is a view showing values regarding conditional expressions in respective examples collectively.

FIG. 18 is aberration charts showing various aberrations of the imaging lens according to the example 1 of the invention.

FIG. 19 is aberration charts showing various aberrations of the imaging lens according to the example 2 of the invention.

FIG. 20 is aberration charts showing various aberrations of the imaging lens according to the example 3 of the invention, FIG. 20A shows a spherical aberration, FIG. 20B shows astigmatism and FIG. 20C shows a distortion.

FIG. 21 is aberration charts showing various aberrations of the imaging lens according to the example 4 of the invention, FIG. 21A shows a spherical aberration, FIG. 21B shows astigmatism and FIG. 21C shows a distortion.

FIG. 22 is aberration charts showing various aberrations of the imaging lens according to the example 5 of the invention,
FIG. 22A shows a spherical aberration, FIG. 22B shows astigmatism and FIG. 22C shows a distortion.

FIG. 23 is aberration charts showing various aberrations of the imaging lens according to the example 6 of the invention, FIG. 23A shows a spherical aberration, FIG. 23B shows astigmatism and FIG. 23C shows a distortion.

FIG. 24 is aberration charts showing various aberrations of the imaging lens according to the example 7 of the invention.

DETAILED DESCRIPTION OF EMBODIMENTS OF THE INVENTION

Embodiments of the invention will be explained in detail with reference to the accompanying drawings hereinafter.

Figure 1:
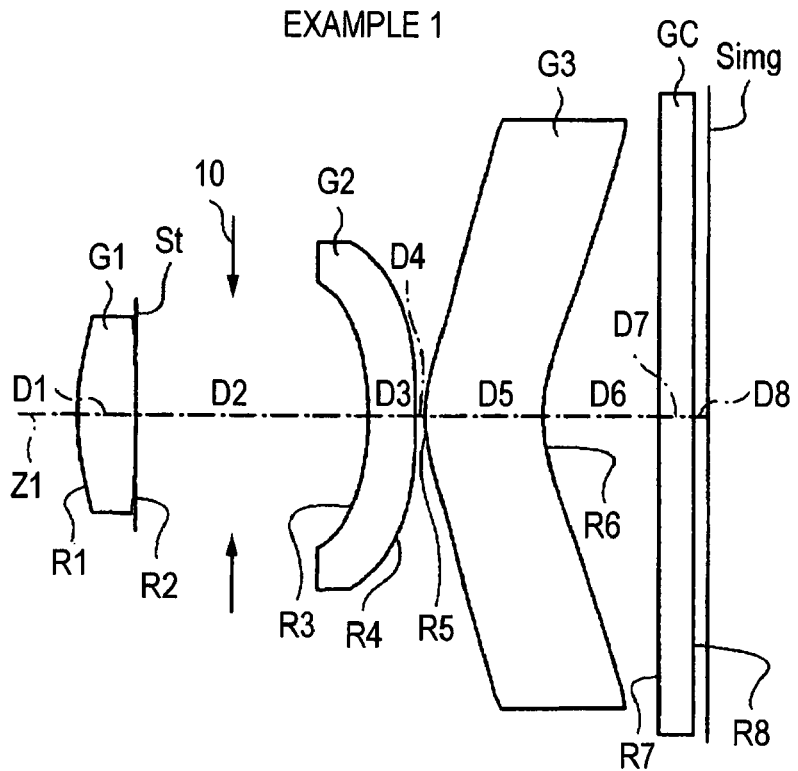
FIG. 1 is a lens sectional view of an imaging lens according to an example 1 of the invention.
Figure 2:
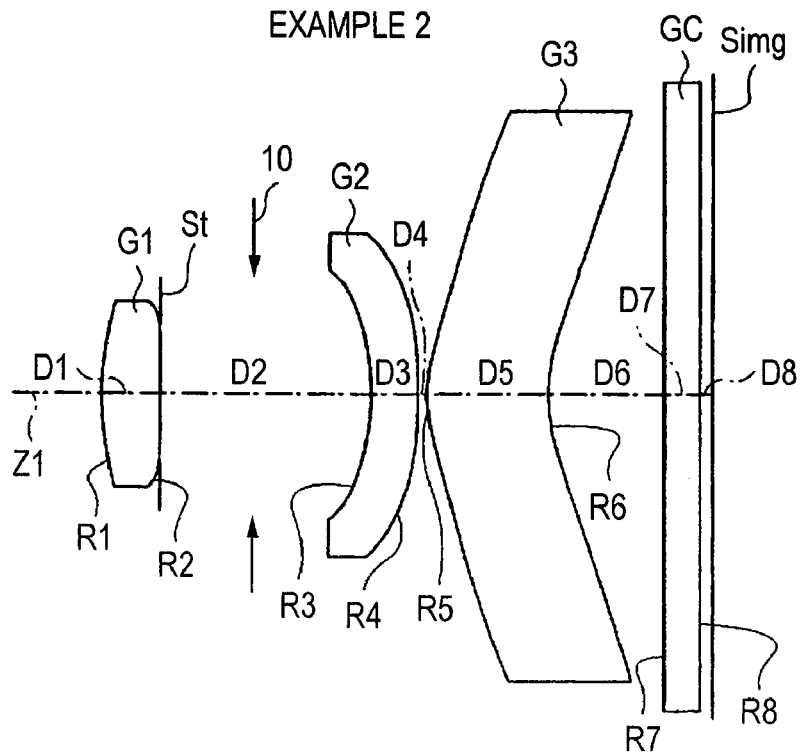
FIG. 2 is a lens sectional view of an imaging lens according to an example 2 of the invention.
Figure 3:
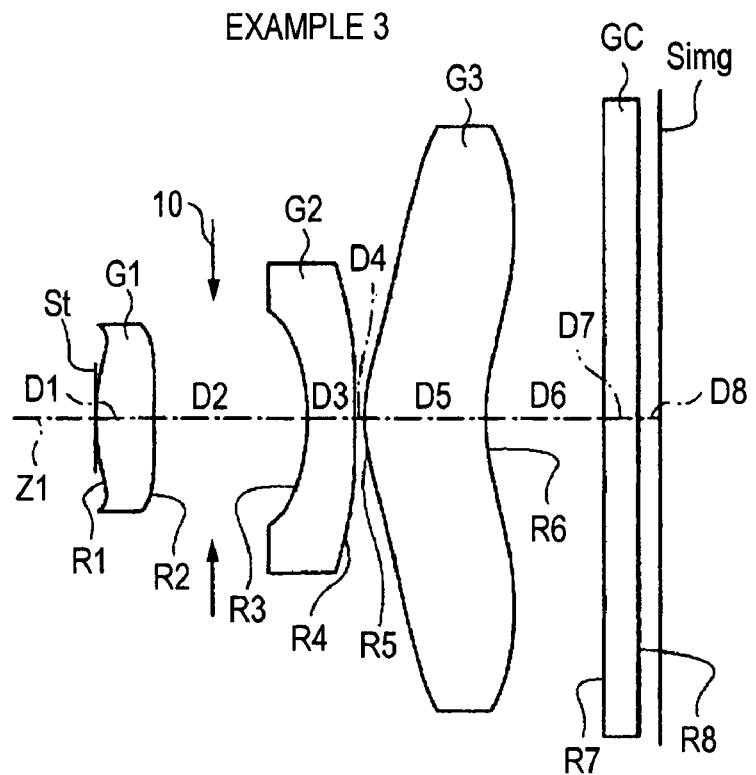
FIG. 3 is a lens sectional view of an imaging lens according to an example 3 of the invention.
Figure 4:
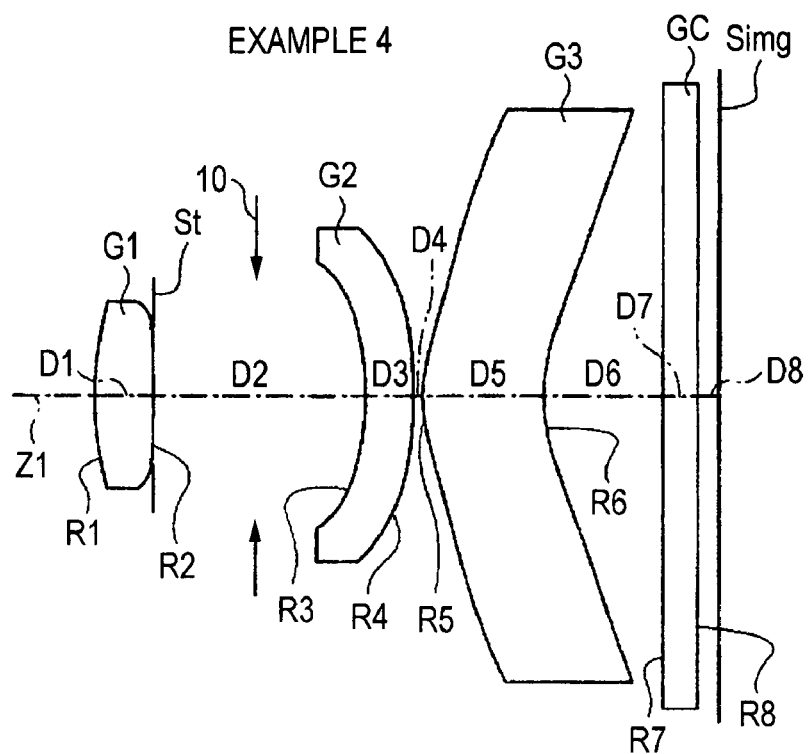
FIG. 4 is a lens sectional view of an imaging lens according to an example 4 of the invention.
Figure 5:
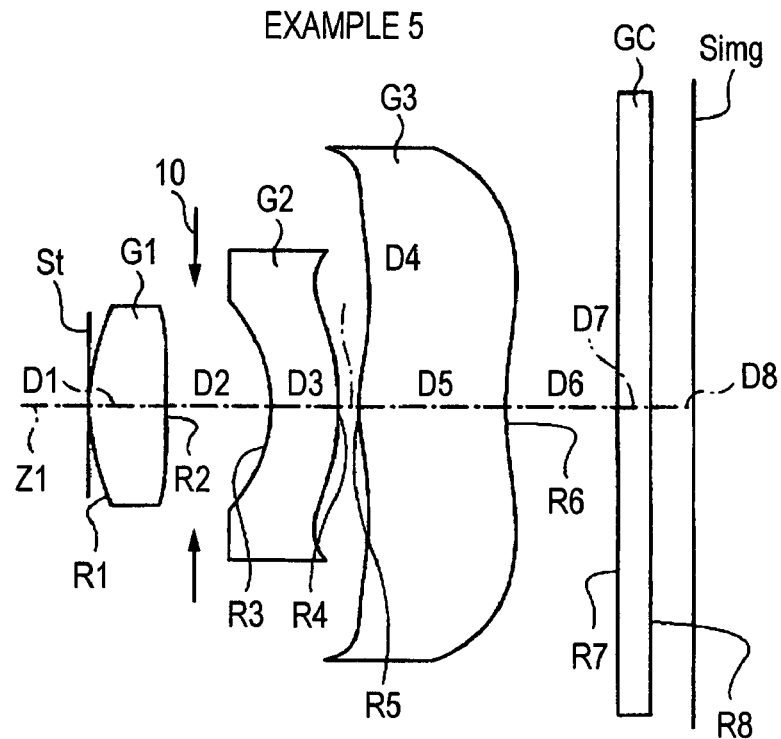
FIG. 5 is a lens sectional view of an imaging lens according to an example 5 of the invention.
Figure 6:
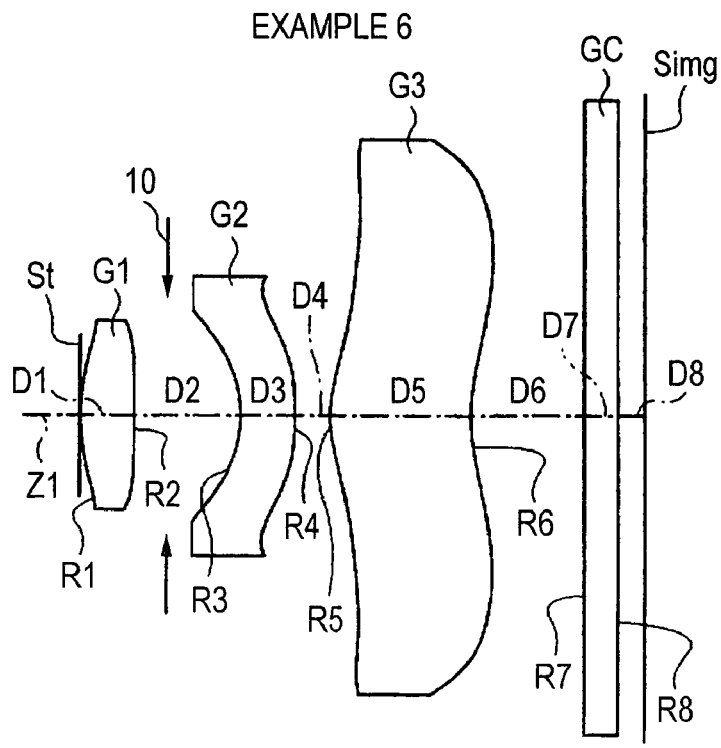
FIG. 6 is a lens sectional view of an imaging lens according to an example 6 of the invention.
Figure 7:
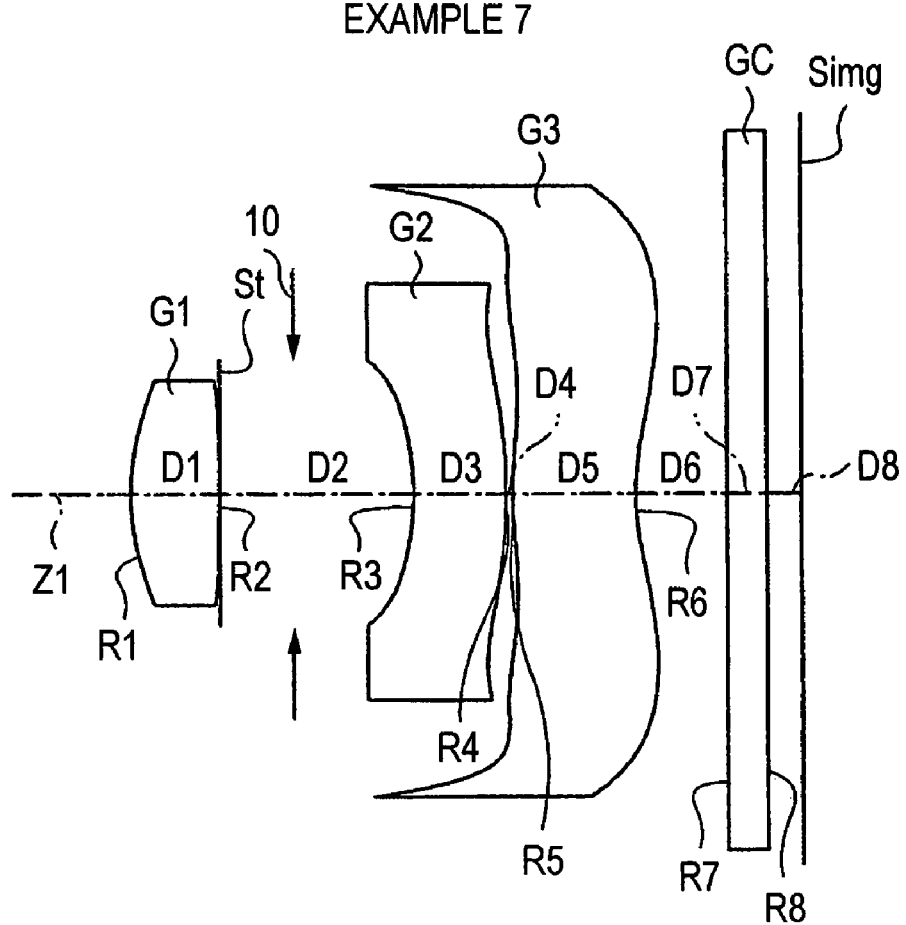
FIG. 7 is a lens sectional view of an imaging lens according to an example 7 of the invention.

FIG. 1 shows a first configuration example of an imaging lens according to an embodiment of the invention. This configuration example corresponds to a lens configuration of a first numerical example (FIGS. 8A and 8B) described later. FIG. 2 shows a second configuration example of an imaging lens according to an embodiment of the invention. This configuration example corresponds to a lens configuration of a second numerical example (FIGS. 9A and 9B) described later. FIG. 3 shows a third configuration example of an imaging lens according to an embodiment of the invention. This configuration example corresponds to a lens configuration of a third numerical example (FIGS. 10A and 10B) described later. FIG. 4 shows a fourth configuration example of an imaging lens according to an embodiment of the invention. This configuration example corresponds to a lens configuration of a fourth numerical example (FIGS. 1A and 11B) described later. FIG. 5 shows a fifth configuration example of an imaging lens according to an embodiment of the invention. This configuration example corresponds to a lens configuration of a fifth numerical example (FIGS. 12 and 13) described later. FIG. 6 shows a sixth configuration example of an imaging lens according to an embodiment of the invention. This configuration example corresponds to a lens configuration of a sixth numerical example (FIGS. 14 and 15) described later. FIG. 7 shows a seventh configuration example of an imaging lens according to an embodiment of the invention. This configuration example corresponds to a lens configuration of a seventh numerical example (FIGS. 16A and 16B) described later. In FIGS. 1 to 7, a reference symbol Ri denotes a radius of curvature of an i-th surface where a surface of a constituent element located on the most-object side is set to a first surface and reference numeral is affixed to the respective surfaces with increasing numeral sequentially as advancing toward the image side (image formation side). A reference symbol Di denotes a surface interval between the i-th surface and the i+1-th surface on an optical axis Z1. In this case, since a basic configuration is identical in respective configurations, explanation will be made hereinafter on the basis of the first configuration example shown in FIG. 1.

This imaging lens is suitable for various imaging devices, such as a digital still camera, a cellular phone with camera, a personal digital assistance, using an imaging element such as CCD and CMOS. This imaging lens has a first lens G1, a second lens G2, and a third lens G3 in order from the object side along the optical axis Z1. At least one of surfaces of the first lens G1, the second lens G2, and the third lens G3 is aspheric.

Preferably, an optical aperture diaphragm St is arranged as closely as possible to the object side to keep the telecentric property. In the configuration examples shown in FIGS. 1, 2, 4 and 7, the aperture diaphragm St is disposed in rear of the first lens G1. In the configuration example shown in FIGS. 3, 5 and 6, the aperture diaphragm St is disposed in front of the first lens G1, that is, on the most-object side of the lens system. A shutter 10 is disposed between the first lens G1 and the second lens G2.

An imaging element such as CCD is disposed on an image formation surface Simg of this imaging lens. Various optical members GC are disposed between the third lens G3 and the imaging element, depending on the configuration of a camera on which the lens is mounted. For example, a flat optical member such as a cover glass for protecting the imaging surface and an infrared cutting filter is disposed.

The first lens G1 has a positive refractive power. The shape of the first lens G1 in the vicinity of the optical axis is biconvex. Preferably, the surface of the first lens G1 on the image side has a convex shape in the vicinity of the optical axis and a convex shape in a peripheral portion, and such a shape as to increase a positive power as advancing to the peripheral portion.

The second lens G2 directs its concave surface toward the object side, and has a negative refractive power. Preferably, the second lens G2 has a biconcave shape in the vicinity of the optical axis. Preferably, the surface of the second lens G2 on the image side has a concave shape in the vicinity of the optical axis and a convex shape in a peripheral portion. With this structure, a numerical range defined by the conditional expression (3) described later can be easily satisfied. As in the configuration examples shown in FIGS. 5, 6 and 7, the surface of the second lens G2 on the image side has a convex shape in the vicinity of the optical axis and a meniscus shape in the vicinity of the optical axis.

The third lens G3 has a positive refractive power, and the shape of the third lens G3 in the vicinity of the optical axis is a meniscus shape whose convex surface is directed to the object side. It is noted that as shown in the configuration example of FIG. 7, the third lens G3 may have a negative refractive power and that the shape of the third lens G3 may be a meniscus shape. The third lens G3 is disposed on most-the imaging surface side. Therefore, unlike the first lens G1 and the second lens G2, a luminous flux is separated for each angle of view in the third lens G3. As a result, when a aspheric surface is used appropriately in the third lens G3, it is easy to perform the aberration correction for each angle of view and it is also easy to correct a field curvature and a distortion aberration. Also, the telecentric property is easily ensured. In the configuration example shown in FIGS. 3, 5, 6 and 7, the surface of the third lens G3 on the image side has a concave shape in the vicinity of the optical axis and a convex shape in the peripheral portion.

This imaging lens satisfies the following conditions.

$$0.7 < f1/f < 1.3 \quad (1)$$

$$0.2 \leq D2/f < 0.5 \quad (2)$$

where f denotes a focal length of the entire system of the imaging lens, f1 denotes a focal length of the first lens G1 and D2 denotes an interval on the optical axis Z1 between the first lens G1 and the second lens G2.

Preferably, this imaging lens satisfies the following conditions.

$$0.3 < |f2/f| < 1.0 \quad (3)$$

$$0.5 < f3/f < 1.0 \quad (4)$$

$$20 < v1 - v2 \quad (5)$$

where f2 denotes a focal length of the second lens G2, f3 denotes a focal length of the third lens G3, v1 denotes Abbe number of the first lens and v2 denotes Abbe number of the second lens.

Next, an operation and advantages of the imaging lens configured as above will be described hereunder.

According to this imaging lens, since the aperture diaphragm St is disposed in front of or in rear of the first lens G1 in the lens configuration having few lenses, that is three lenses as a whole, the lens system which is advantageous in reduction of a total length and maintenance of the telecentric property can be obtained. Also, since the respective conditional expressions are satisfied, the refractive powers of the respective lenses and the arrangement of the respective lenses are optimized and a sufficient internal space where the shutter mechanism is disposed can be ensured while maintaining the high aberration performance compatible with the increase in the number of pixels. In this imaging lens, since the shapes of the first lens G1 in the vicinity of the optical axis are biconvex, it is easy to keep the interval where the shutter mechanism is disposed in rear of the first lens G1 in comparison with the case where the surface of the first lens G1 on the image side has a concave shape. In addition, since the surface of the first lens G1 on the image side has such a shape as to increase a positive power as advancing to the peripheral portion, it is easy to keep the interval where the shutter mechanism is disposed.

Also, in this imaging lens, the aberration correction can be made more effectively by optimizing the respective aspheric surfaces. Also, in order to deal with the imaging element having larger pixels, the telecentric property, that is, an incident angle of the principal ray to the imaging element is set closely in parallel to the optical axis (incident angle on the imaging plane comes close to zero with respect to a normal line to the imaging plane) is demanded. In this imaging lens, like the configuration examples shown in FIGS. 3, 5, 6 and 7, for example, the surface of the third lens G3 on the image side, which is the final lens surface closest to the imaging element, has a concave shape on the image side in the vicinity of the optical axis and also has a convex shape on the image side in the peripheral portion. Therefore, the aberration correction is made appropriately for each angle of view and an incident angle of the luminous flux to the imaging element is controlled less than a predetermined angle. As a result, unevenness of a quantity of light in the overall image formation surface can be reduced and this configuration is advantageous in correcting the field curvature and the distortion aberration.

The conditional expression (1) relates to the focal length f1 of the first lens G1. When f1/f exceeds this numerical range, a power of the first lens G1 is excessively reduced and it is difficult to shorten a total length. Also, when f1/f is lower than this numerical range, it is difficult to correct the field curvature and the astigmatism, and an exit pupil angle becomes excessively large, which is not preferable.

The conditional expression (2) relates to the interval D2 between the first lens G1 and the second lens G2 and the focal length f of the entire system. When D2/f exceeds this numerical range, it is difficult to shorten a total length. Also, when D2/f is lower than this numerical range, the interval D2 between the first lens G1 and the second lens G2 cannot be ensured sufficiently, and it is difficult to arrange the shutter mechanism.

The conditional expression (3) relates to the focal length f2 of the second lens G2. When f2/f exceeds this numerical range, a power of the second lens G2 is excessively reduced and it is difficult to shorten a total length. Also, when f2/f is lower than this numerical range, it is difficult to correct the field curvature and the astigmatism. The conditional expression (4) relates to the focal length f3 of the third lens G3. Particularly, in the case where the third lens G3 has a positive refractive power, if f3/f is out of this numerical range in either of higher or lower direction, a power balance between the third lens G3 and the second lens G2 is lost, so that it is difficult to correct various aberrations while keeping a total length short. The conditional expression (5) relates to the Abbe numbers of the first lens G1 and the second lens G2. When ν1−ν2 is lower than this numerical range, it is difficult to correct sufficiently the chromatic aberration.

As described above, according to the imaging lens of this embodiment, the shapes and the refractive powers of the respective lenses and the arrangement of the respective lenses are optimized in the lens configuration having few lenses, that is, three lenses as a whole by satisfying the predetermined conditional expressions. Therefore, the small-sized and high-performance lens system capable of ensuring the sufficient internal interval where the shutter mechanism is disposed while maintaining the high aberration performance compatible with the increase in the number of pixels can be realized.

EXAMPLES

Next, specific numerical examples of the imaging lens according to this embodiment will be described hereunder. First to seventh numerical examples will be described collectively in the following.

Specific lens data corresponding to the configuration of the imaging lens shown in FIG. 1 are shown as an example 1 in FIGS. 8A and 8B. In particular, basic lens data are shown in FIG. 8A, and data regarding the aspheric surface are shown in FIG. 8B. A column of a surface number Si in the lens data shown in FIG. 8A shows number of i-th (I=1 to 8) surface in such a manner that the surface of the constituent element located on the most-object side is set to the first surface and the surface number is increased sequentially as advancing to the image side. A column of a radius of curvature Ri shows values (mm) of a radius of curvature of an i-th surface from the object side to correspond to a radius of curvature Ri shown in FIG. 1. A column of a surface interval Di shows intervals (mm) between an i-th surface Si and an i+1-th surface Si+1 on the optical axis in order from the object side. Ndj denotes values of a refractive index of a j-th (j=1 to 4) optical element with respect to the d line (wavelength 587.6 nm) in order from the object side. A column of an Abbe number νdj shows values of an Abbe number of a j-th optical element with respect to the d line. Also, a paraxial focal length f (mm) of the entire system and an F number (FNo.) are shown in FIG. 8A as various data.

In the imaging lens according to this example 1, all both surfaces of the first lens G1, both surfaces of the second lens G2, and both surfaces of the third lens G3 are aspheric. The basic lens data in FIG. 8A shows numerical values of the radius of curvature in the vicinity of the optical axis as radius of curvatures of the aspheric shapes. As to numerical values given as the aspheric data in FIG. 8B, a symbol "E" denotes that a numerical value subsequent to "E" is a "power exponent" to the base 10, and means that the numerical value preceding to "E" is multiplied by the numerical value that is expressed by the exponential function using 10 as the base. For example, "1.0E−02" corresponds to "1.0×10⁻²".

As the aspheric data, values of respective coefficients $A_n$, K in the aspheric shape equation represented by the following equation A are given. In more detail, Z denotes a length (mm) of a perpendicular line drawn from a point on an aspheric surface at a height "h" toward the optical axis Z1 and a tangent plane at an apex of the aspheric surface (a plane perpendicular to the optical axis Z1). In the imaging lens according to the example 1, the respective aspheric surfaces are expressed by using the third to tenth coefficients $A_3$ to $A_{10}$ effectively as the aspheric coefficient $A_n$.

$$Z = C \cdot h^2 / \{1 + (1 - K \cdot C^2 \cdot h^2)^{1/2}\} + \Sigma A_n \cdot h^n \quad (A)$$

(n=integral number of 3 or more)

where Z: depth of aspheric surface (mm)

h: distance (height) from the optical axis to the lens surface (mm)

K: eccentricity (secondary aspheric coefficient)

C: paraxial curvature=1/R (R: paraxial radius of curvature)

$A_n$: n-th aspheric coefficient

Like the imaging lens according to the example 1, specific lens data corresponding to the configuration of the imaging lens shown in FIG. 2 are shown as an example 2 in FIGS. 9A and 9B. Also, specific lens data corresponding to the configuration of the imaging lens shown in FIG. 3 are shown as an example 3 in FIGS. 10A and 10B. Also, specific lens data corresponding to the configuration of the imaging lens shown in FIG. 4 are shown as an example 4 in FIGS. 11A and 11B. Also, specific lens data corresponding to the configuration of the imaging lens shown in FIG. 7 are shown as an example 7 in FIGS. 16A and 16B. In the imaging lens according to any of the second to fourth and seventh examples, like the example 1, all both surfaces of the first lens G1, both surfaces of the second lens G2, and both surfaces of the third lens G3 are aspheric.

Furthermore, specific lens data corresponding to the configuration of the imaging lens shown in FIG. 5 are shown as an example 5 in FIGS. 12 and 13. Similarly, specific lens data corresponding to the configuration of the imaging lens shown in FIG. 6 are shown as an example 6 in FIGS. 14 and 15. In the imaging lens according to any of the fifth and sixth examples, like the example 1, all both surfaces of the first lens G1, both surfaces of the second lens G2, and both surfaces of the third lens G3 are aspheric. In the examples 5 and 6, the both surfaces (third and fourth surfaces) of the second lens G2 and the both surfaces (fifth and sixth surfaces) of the third lens G3 are expressed by using the third to sixteenth coefficients $A_3$ to $A_{16}$ effectively as the aspheric coefficient $A_n$.

FIG. 17 shows values regarding the respective conditional expressions collectively. As can be seen from FIG. 17, the values of the examples 1 to 6 are within the numerical values of the respective conditional expressions. The values of the example 7 are within the numerical values of the respective conditional expressions except the conditional expression (4).

Figure 18A:
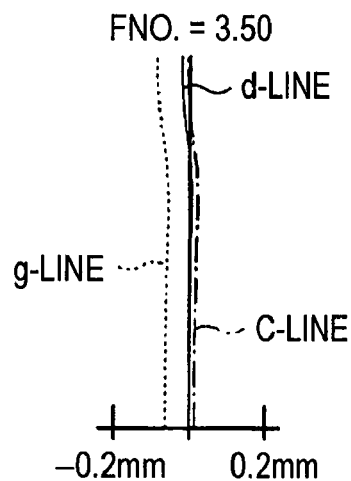
FIG. 18A shows a spherical aberration.
Figure 18B:
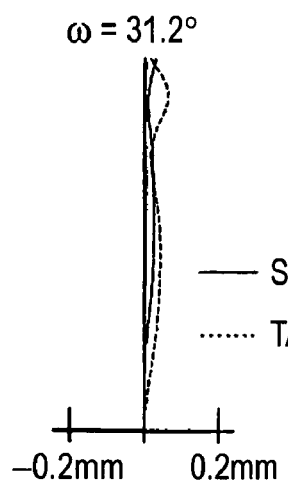
FIG. 18B shows astigmatism and FIG. 18C shows a distortion.
Figure 18C:
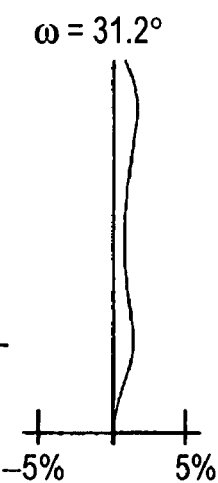

FIGS. 18A to 18C show the spherical aberration, the astigmatism, and the distortion (distortion aberration) in the imaging lens according to the example 1, respectively. Each aberration chart shows an aberration with using the d line as a reference wavelength. Each spheric aberration chart also shows an aberration with respect to the g line (wavelength 435.8 nm) and the c line (wavelength 656.3 nm). In the astigmatism chart, a solid line shows an aberration in the sagittal direction and a broken line shows an aberration in the tangential direction. FNo denotes an F value, and ω denotes a half angle of view.

Figure 19A:
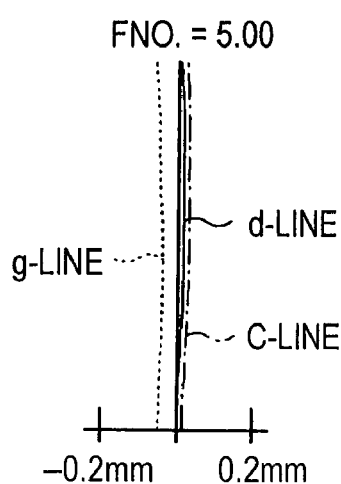
FIG. 19A shows a spherical aberration.
Figure 19B:
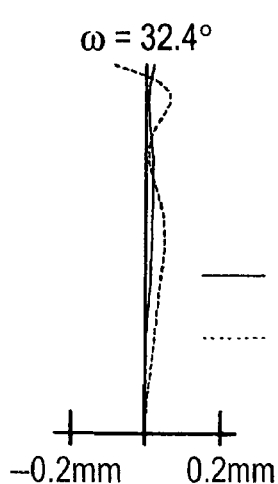
FIG. 19B shows astigmatism and FIG. 19C shows a distortion.
Figure 19C:
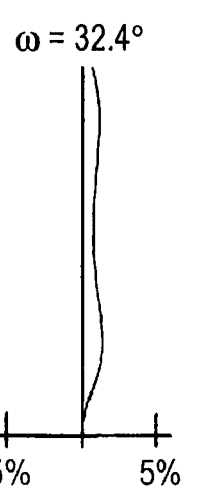

Similarly, various aberrations in the imaging lens according to the example 2 are shown in FIGS. 19A to 19C, various aberrations in the imaging lens according to the example 3 are shown in FIGS. 20A to 20C and various aberrations in the imaging lens according to the example 4 are shown in FIGS.

Figures 24A, 24B, 24C:
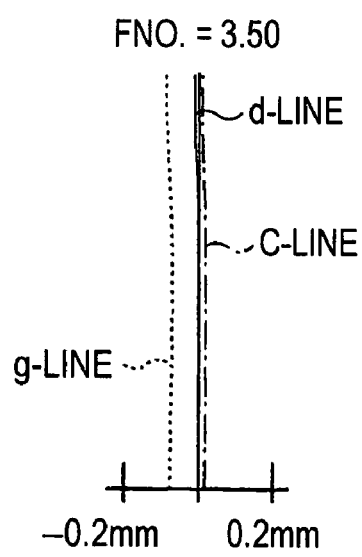
FIG. 24A shows a spherical aberration.
FIG. 24B shows astigmatism and FIG. 24C shows a distortion.

21A to 21C. Also, various aberrations in the imaging lens according to the example 5 are shown in FIGS. 22A to 22C, and various aberrations in the imaging lens according to the example 6 are shown in FIGS. 23A to 23C. Various aberrations in the imaging lens according to the example 7 are shown in FIGS. 24A to 24C As can be understood from the respective numerical data and the respective aberration charts, the small-sized and high-performance lens system in which lens materials, surface shapes of the respective lenses and the power distribution of the respective lenses are optimized in the lens configuration having three lenses as a whole and also the internal interval used to arrange the shutter mechanism therein is ensured sufficiently can be realized in the respective examples.

The invention is not limited to the above embodiment and the respective examples, and various variations can be carried out. For example, values of the radius curvature, the surface interval, the refractive index, and the like in respective lens components are not limited to the values given in respective numerical examples, and other values may be employed.

What is claimed is:

1. An imaging lens comprising:
   a first lens having a biconvex shape in a vicinity of an optical axis;
   a second lens having a concave surface facing a object side, the second lens having a negative refractive power; and
   a third lens having a positive or negative refractive power and having a meniscus shape containing, in a vicinity of the optical axis, a convex surface facing the object side, wherein:
   the first lens, the second lens and the third lens are arranged in order from the object side,
   at least one of surfaces of the first to third lenses is aspherical, and
   the following conditional expression is satisfied:

$0.7 < f1/f < 1.3$ $0.2 \leq D2/f < 0.5$ where f denotes a focal length of the entire system of the imaging lens, f1 denotes a focal length of the first lens and D2 denotes an interval on the optical axis between the first lens and the second lens,
   wherein, in said imaging lens, there is no lens, between said first and second lenses, contributing to said focal length f.

2. An imaging lens comprising:
   a first lens having a biconvex shape in a vicinity of an optical axis;
   a second lens having a concave surface facing a object side, the second lens having a negative refractive power; and
   a third lens having a positive or negative refractive power and having a meniscus shape containing, in a vicinity of the optical axis, a convex surface facing the object side, wherein:
   the first lens, the second lens and the third lens are arranged in order from the object side,
   at least one of surfaces of the first to third lenses is aspherical, and
   the following conditional expression is satisfied:

$0.7 < f1/f < 1.3$ $0.2 \leq D2/f < 0.5$ where f denotes a focal length of the entire system of the imaging lens, f1 denotes a focal length of the first lens and D2 denotes an interval on the optical axis between the first lens and the second lens, and
   wherein the following conditional expression is further satisfied:

$0.3 < |f2/f| < 1.0$ $0.5 < f3/f < 1.0$ where f2 denotes a focal length of the second lens and f3 denotes a focal length of the third lens.

3. The lens according to claim 1, wherein the following conditional expression is further satisfied:

$20 < v1 - v2$ where v1 denotes Abbe number of the first lens and v2 denotes Abbe number of the second lens.

4. The lens according to claim 2, wherein the following conditional expression is further satisfied:

$20 < v1 - v2$ where v1 denotes Abbe number of the first lens and v2 denotes Abbe number of the second lens.

5. The lens according to claim 1, wherein the second lens has a meniscus shape in a vicinity of the optical axis.

6. The lens according to claim 2, wherein the second lens has a meniscus shape in a vicinity of the optical axis.

7. The lens according to claim 3, wherein the second lens has a meniscus shape in a vicinity of the optical axis.

8. The lens according to claim 4, wherein the second lens has a meniscus shape in a vicinity of the optical axis.

9. The lens according to claim 1, wherein the second lens has a biconcave shape in a vicinity of the optical axis.

10. The lens according to claim 2, wherein the second lens has a biconcave shape in a vicinity of the optical axis.

11. The lens according to claim 3, wherein the second lens has a biconcave shape in a vicinity of the optical axis.

12. The lens according to claim 4, wherein the second lens has a biconcave shape in a vicinity of the optical axis.

13. The lens according to claim 9, wherein the following conditional expression is further satisfied:

$20 < v1 - v2$ where v1 denotes Abbe number of the first lens and v2 denotes Abbe number of the second lens.

14. The lens according to claim 1, wherein the first surface of the first lens is aspherical.

15. The lens according to claim 1, wherein the first surface of the second lens is aspherical.

16. The lens according to claim 3, wherein the first surface of the third lens is aspherical.

17. The lens according to claim 9, wherein the first surface of the first lens is aspherical.

18. The lens according to claim 9, wherein the first surface of the second lens is aspherical.

19. The lens according to claim 9, wherein the first surface of the third lens is aspherical.

20. The lens according to claim 1, wherein the second surface of the first lens is aspherical.

21. The lens according to claims 1, wherein the second surface of the second lens is aspherical.

22. The lens according to claim 1, wherein the second surface of the third lens is aspherical.

23. The lens according to claim 9, wherein the second surface of the first lens is aspherical.

24. The lens according to claim 9, wherein the second surface of the second lens is aspherical.

25. The lens according to claim 9, wherein the second surface of the third lens is aspherical.

26. The lens according to claim 1, wherein a shutter mechanism is disposed between the first lens and the second lens.

27. The lens according to claim 9, wherein a shutter mechanism is disposed between the first lens and the second lens.

28. The lens according to claim 1, wherein an aperture diaphragm is disposed either in front of the first lens or between the first and second lenses.

29. The lens according to claim 9, wherein an aperture diaphragm is disposed either in front of the first lens or between the first and second lenses.

30. The lens according to claims 1, wherein an infrared cutting filter is disposed behind the third lens.

* * * * *